United States Patent [19]
Orr

[11] Patent Number: 5,748,963
[45] Date of Patent: May 5, 1998

[54] ADAPTIVE BINDING

[75] Inventor: Michael B. Orr, Bainbridge Island, Wash.

[73] Assignee: Design Intelligence, Inc., Seattle, Wash.

[21] Appl. No.: 437,417

[22] Filed: May 12, 1995

[51] Int. Cl.$^6$ ......................................................... G06F 9/30
[52] U.S. Cl. ...................... 395/704; 395/705; 395/710; 395/385; 395/567; 395/685; 364/280.4; 364/973
[58] Field of Search ................................. 364/280.4, 973; 395/705, 708, 709, 262.4, 385, 704, 710, 567, 685

[56] References Cited

U.S. PATENT DOCUMENTS

| | | | |
|---|---|---|---|
| 5,367,685 | 11/1994 | Gosling | 395/700 |
| 5,421,016 | 5/1995 | Conner et al. | 395/700 |
| 5,452,456 | 9/1995 | Mourey et al. | 395/700 |
| 5,469,574 | 11/1995 | Chang et al. | 395/700 |
| 5,488,727 | 1/1996 | Agrawal et al. | 395/700 |
| 5,515,536 | 5/1996 | Corbett et all. | 395/700 |

OTHER PUBLICATIONS

Soliman et al., "Dynamic Genericity in Imperative Languages: Example in CML", Proceedings. ICCI '92. Fouth International Conference on Computing and Information, pp. 96–99, May 28, 1992.

Brashean, P. "Object–oriented Programming In Ada", Proceedings of the IEEE 1992 National Aerospace and Electronics Conference , NAECON 1992, pp. 543–549, vol. 2, May 18, 1992.

IBM Technical Disclosure Bulletin, vol. 29, No. 8 Jan. 1987, New York, p. 3521, "Execution–Time Loading Using Self–Modifying Stubs".

IBM Technical Disclosure Bulletin, vol. 30, No. 9, Feb. 1988, p. 373, "Dynamic Loading Using an Extended Router Linkage Mechansim".

*Primary Examiner*—Alvin E. Oberley
*Assistant Examiner*—Michael T. Richey
*Attorney, Agent, or Firm*—Stoel Rives LLP

[57] ABSTRACT

The invention includes an efficient method of dynamically binding an operation (22) to an implementation. During a first occurrence of the operation, the operation identifier and argument information are compared with entries (52) in a dictionary (50) to determine an appropriate implementation. The operation is modified by replacing the operation identifier (58) and argument information (60) with a reference to a matching entry (52). Upon subsequent execution of the operation, the interpreter checks to see whether the types of the arguments in the current function call match those in the dictionary entry. If they match, the implementation referenced by the dictionary entry is executed. If they do not match, the dictionary is searched for a matching entry. Because most operations do not change types of arguments during most function calls, the invention results in greatly improved efficiency.

16 Claims, 2 Drawing Sheets

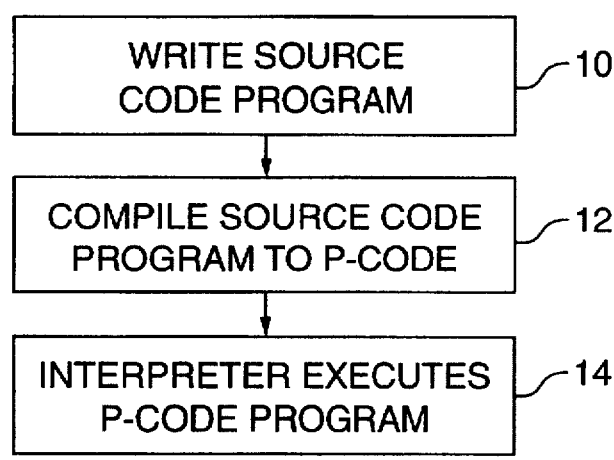
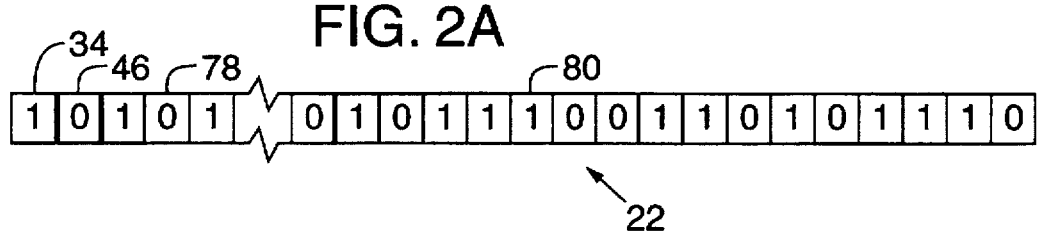
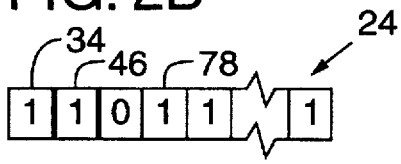
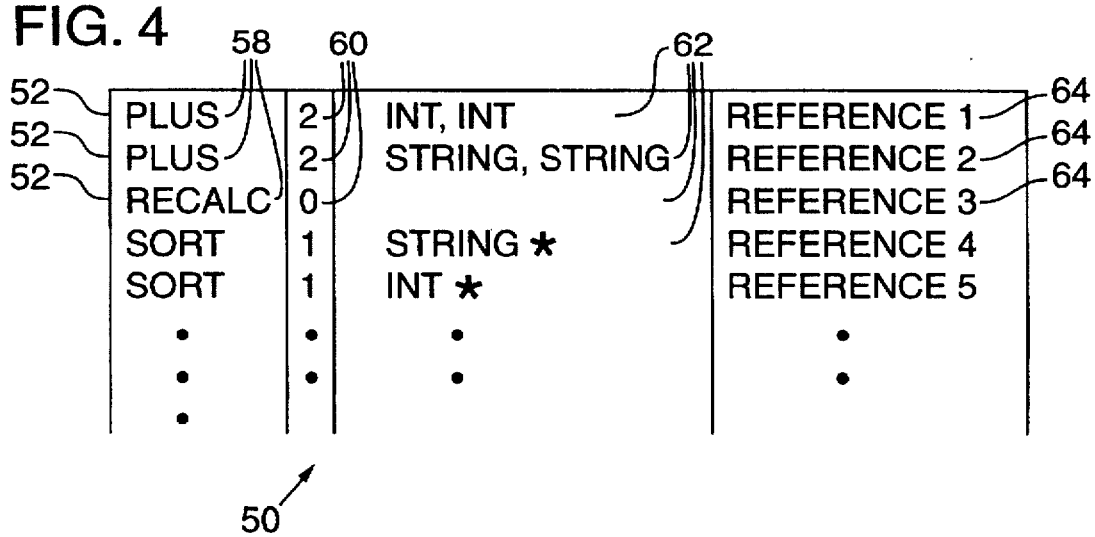

ADAPTIVE BINDING

TECHNICAL FIELD

This invention relates to methods used in computer software environments for binding an entity to an identifier and, more specifically, to an efficient method for binding function implementations to function calls.

BACKGROUND OF THE INVENTION

Pseudo-codes or "p-codes" are auxiliary computer languages, typically at an abstraction level between that of a high-level language and a machine language. P-code programs are typically generated by compiling or parsing a high-level language source program. P-code can be thought of as a lower level language that is designed to run on an abstract, rather than a real, machine. Programs are not typically written in a p-code language, and real machines do not typically run p-code as a machine language. P-code program instructions are typically executed by on a machine, or hardware platform, by an interpreter.

P-codes first became popular in the implementation of the Pascal computer language. Pascal compilers would compile the source code of a Pascal program into p-code, which would then be interpreted by a p-code interpreter for a particular hardware platform. Such a system simplified the implementation of Pascal onto multiple hardware platforms and is partly responsible for the success of the Pascal language. Pascal p-code was similar to an assembly language for an abstract p-code machine that used a stack-based architecture comprising five registers.

Most programming languages, including p-codes, allow the use of identifiers to represent entities, such as data or instructions. For example, an identifier "GRADE" may represent a memory location at which a student's grade is stored and an identifier "PRINT_GRADE" may represent a group of instructions that print the student's grade. At some point in a program, an entity is associated with, or "bound" to, a particular identifier. The act of associating an entity with an identifier is called "binding," and the time at which the binding occurs is called "binding time."

Binding times are typically classified into one of two categories: early, or static binding, which occurs before a program is run, and late, or dynamic binding, which occurs during program execution. Programming languages can use either type of binding or a combination of the two. With static binding, the binding of an identifier can be determined without running the program. Such binding typically occurs as the program is being compiled, although some binding, such as the binding of an identifier to a library function, occurs as the program is linked with the library. Static binding is the most common type of binding. Static binding is efficient because the identifiers are tightly linked before program execution to the entities they represent, and the linking does not require any time-consuming run-time determination.

Dynamic binding is used in a small number of languages, such as Smalltalk and Eiffel. In dynamic binding, the binding of an identifier is not determinable until the identifier is encountered during program execution. Moreover, the binding of an identifier can change during program execution, i.e., different entities can be bound to an identifier as it is encountered at different times during program execution.

For example, a function name is an identifier. The entity that is bound to the function name is called an "implementation" of the named function. A "function call" occurs when a function name is encountered during program execution. The interpreter "dispatches" the function in response to the function call. There can be more than one possible implementation to which a particular function name can be bound, although only a single implementation is bound to the function name during any particular function call. The implementation that is bound to a function name during a particular function call will typically depend upon the "signature" of the function, i.e., the function name and the data types of the arguments passed with the function call.

One method of dispatching a function in a dynamic binding environment entails creating a data structure known as a "dictionary." Each entry in the dictionary includes a function identifier, information relating to the number and types of formal function arguments, and the address of a corresponding implementation. When a function call occurs the dictionary is searched for an entry having a function identifier matching that of the function call and having formal arguments that match the actual arguments of the function call. If a matching dictionary entry is found, the address of the appropriate implementation is returned to the calling program.

Dynamic binding offers flexibility because the data types of function arguments do not need to be determined when the program is compiled. The data types upon which a function acts can, therefore, depend upon user input, rather than having to be predetermined by a programmer. Unfortunately, searching the dictionary for an appropriate implementation every time a function is called reduces program execution speed, thereby limiting the applicability of dynamic binding.

SUMMARY OF THE INVENTION

An object of the present invention is, therefore, to provide a flexible and efficient mechanism for associating an identifier with an entity.

Another object of this invention is to provide such a mechanism that allows for efficient dispatch of dynamically bound functions.

A further object of this invention is to provide a mechanism for efficiently storing information, such as binding information, during program execution for subsequent use during program execution.

Yet another object of this invention is to provide such a mechanism without creating additional memory structures.

The present invention, known as adaptive binding, is a method for improving efficiency in a computer programming language that uses run-time binding. In the present invention, the identity of an entity to which an identifier is bound during an occurrence of the identifier is stored, preferably by modifying the code that includes the identifier. When the identifier is subsequently encountered during program execution, the identifier is tentatively bound to same entity to which it was previously bound. The tentative binding is verified in accordance with polymorphic and scoping rules and, if it is not appropriate, a different, appropriate binding is determined.

In a preferred embodiment, a dictionary contains at least one entry that includes a function identifier corresponding to a function to be dispatched. Each dictionary entry can be uniquely identified, for example, by a key or by an index. Each entry in the dictionary includes a function identifier, formal function argument information, and a reference to an implementation of the function.

The formal function argument information typically includes the number and types of formal arguments required by the corresponding implementation. When a particular function call is first encountered during the execution of a program, such as an interpreted p-code program, the function identifier and the number and type of the actual arguments are compared to the dictionary entries. When a match is found, the source p-code is modified by replacing the function identifier and number of arguments with a reference to the matching dictionary entry. The interpreter then executes the implementation indicated by the matching dictionary entry.

During a subsequent execution of the same section of p-code, the interpreter will encounter the modified p-code, which has the dictionary entry reference in place of the function identifier that was in the original p-code. The interpreter locates the previously matched dictionary entry and compares the types of the actual arguments in the current function call with the types of the formal arguments in the dictionary entry.

If the types of the actual arguments match the types of the formal arguments in the dictionary entry, the interpreter executes the implementation at the address indicated in the dictionary entry. If the types of the actual arguments in the function call do not match the types of the formal arguments in the dictionary entry, the interpreter reads the function identifier and the number of formal arguments from the dictionary entry, thereby recovering the information that was replaced in the p-code by the reference to the dictionary entry. Having recovered the function identifier and number of arguments, the interpreter can search the dictionary for a matching entry to determine an appropriate function implementation.

Because many dynamically bound functions do not change argument number and types during program execution, the present invention eliminates the time-consuming dictionary look-up step in many cases. Even functions that do change argument number and types during execution do not typically change argument types every time they are dispatched, so the present invention improves dispatch efficiency in the majority of dispatches.

Although the present invention is not limited to storing information about the previous dispatch in modified p-code, such storage provides multiple benefits. By storing the information about the previous dispatch in the p-code itself, the interpreter does not need to create additional memory structures to store the information. Using such additional structures would require an additional step, would use additional memory, and would complicate memory management. Moreover, by storing the information in the p-code itself, different dispatch information is stored for function calls of the same function in different parts of the program, thereby increasing the likelihood that the previous implementation will be appropriate for a subsequent function call. Also, because multiple program instances may share a single copy of the p-code text, second and subsequent program instances may avoid a time consuming method look-up, further improving run-time efficiency.

The present invention allows for the efficient implementation of polymorphism, that is, the ability of a function call to handle multiple types of arguments, the type that will be used during a particular occurrence not being determined until the program is being run.

Additional objects and advantages of the present invention will be apparent from the following detailed descriptions of preferred embodiments thereof, which proceeds with reference to the accompanying drawings.

BRIEF DESCRIPTION OF THE DRAWINGS

FIG. 1 is an flowchart indicating the steps of a preferred embodiment of the present invention.

FIGS. 2 and 2B are illustrations of typical p-code items representing an unbound operation and a bound operation, respectively.

FIG. 4 is an example of a dictionary used with the present invention for implementing the p-code items of FIG. 2.

DETAILED DESCRIPTION OF PREFERRED EMBODIMENTS

Figure 3:
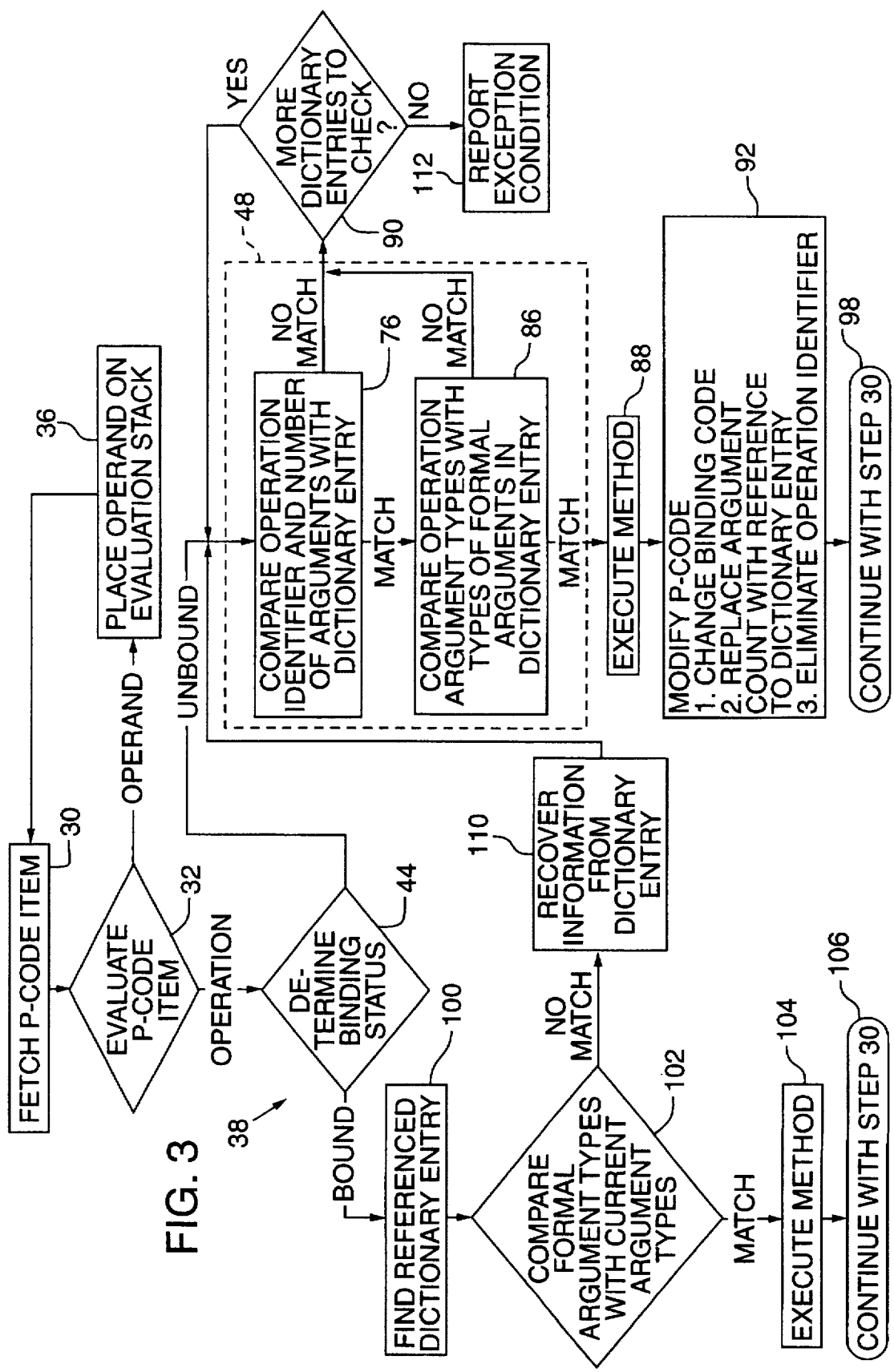
FIG. 3 is a flowchart showing the steps of a preferred embodiment of the present invention.

The present invention is preferably implemented in a p-code based environment, although it is not limited to such an environment. FIG. 1 is a flowchart showing an overview of a typical system utilizing the method of the present invention. Step 10 shows that a programmer writes a program in a source language. The source program is compiled, step 12, into a p-code having a format compatible with an interpreter that executes the p-code (step 14) using the adaptive binding methods of the present invention.

FIGS. 2A and 2B shows typical p-code items 22 and 24 produced as a result of compiling the source code into p-code in step 12. P-code items can include, for example, operations, variables, operands, and markers such as those used to separate expressions. Each p-code item consists of coded fields that indicate to the p-code interpreter the type of item and the appropriate handling of the item.

The term "operation" is used to refer to a p-code item that represents a function call and the term "method" will be used to represent an implementation of an operation. An operation may have more than one corresponding method, each different method taking different types of arguments.

FIG. 3 shows the steps performed by an interpreter in carrying out a preferred method of the present invention. It will be understood that FIG. 3 shows only steps related to one embodiment the present invention and that additional steps may also performed by the interpreter.

Step 30 shows that the p-code interpreter fetches a p-code item, and step 32 indicates that the interpreter evaluates the p-code item to determine what it represents. A "1" in a first single-bit field 34 signals the interpreter that the p-code item represents an operation; a "0" in single-bit field 34 signals the interpreter that the p-code item represents an operand. The p-code items in FIGS. 2A and 2B each have a "1" in single-bit field 34 and, therefore, represent operations. If the p-code item represents an operand, step 36 shows that the operand is placed on an evaluation stack. If the p-code item represents an operation, the interpreter begins to execute the operation, as shown by section 38 of the flowchart of FIG. 3. The arguments, if any, used by the operation will be the operands on the evaluation stack.

Step 44 shows that the interpreter determines whether the operation is bound by looking at the binding code in a second, single-bit, binding field 46 (FIGS. 2A and 2B). If the binding code of the operation is "0" as in FIG. 2A, step 48 indicates that the interpreter will determine which method to use to implement the operation by searching a look-up table, such as a dictionary 50 shown in FIG. 4. Dictionary 50 includes multiple dictionary entries 52, each entry 52 including an operation identifier 58, an integer 60 indicating the number of arguments, a list 62 of types of arguments, and a reference 64 to a method that implements the operation. It will be understood that English language-type entries 52 are shown in FIG. 4 to facilitate understanding of the invention. The actual entries 52 are stored in binary form. For instance, the operation identifier is represented in p-code item 24 and in dictionary 50 as a two-byte compact name, or atom, derived from a function name in the source program during compilation step 12 by any of several known string hashing methods.

Step 48 includes a first substep 76 in which the interpreter compares the operation identifier and the number of arguments stored in fields 78 and 80, respectively, in p-code item 24 to determine whether an entry 52 may be a match for the p-code operation. If the operation identifier and the number of arguments match, the interpreter continues with substep 86 in which it compares the types of the arguments on the evaluation stack with the formal argument types in the dictionary entry. In a typical implementation, no more than a single dictionary entry will match any particular operation encounter. As indicated by decision block 90, the p-code interpreter continues to search dictionary 50 until a matching entry 52 is located or until all entries 52 have been checked.

After locating a matching dictionary entry, step 88 shows that the interpreter will execute the method referenced by the dictionary entry. Step 92 shows that the interpreter will also modify the p-code operation item to include a reference to the corresponding dictionary entry 52 and to remove information that can be obtained from the referenced dictionary entry. For example, the interpreter replaces multi-bit field 78 containing the number of arguments with a reference to the matching dictionary entry and eliminates field 80 containing the operation identifier.

The interpreter also changes binding field bit 46 to "1" to indicate to the interpreter at a subsequent occurrence of the operation that it is adaptively bound. FIG. 2B shows a modified p-code item 22, which includes a "1" in the first bit field 34, indicating that the p-code item is an operation; a "1" in the binding field 46, indicating that the operation is bound; and a dictionary entry key in the third multi-bit field 78. Step 98 shows that the interpreter then continues execution of the p-code program by returning to step 30.

The interpretation of the information stored in multi-bit field 78 thus depends upon the value of binding field 46: If binding field 46 contains a "0", the information in multi-bit field 78 is interpreted to be the number of arguments required by the operation, and, if binding field 46 contains a "1", the information in multi-bit field 78 is interpreted to be a reference to a dictionary entry 52. Also, a "1" in binding field 46 indicates to the interpreter that the p-code operation that follows does not include a field 80 for an operation identifier.

If p-code item has a "1" in the first single-bit bit field 34 and a "1" in binding field 46, the interpreter will determine in step 44 that the p-code item represents a bound operation, and the interpreter will then use the dictionary entry reference stored in multi-bit field 74, as shown in step 100, to find the corresponding dictionary entry 52. An adaptively bound operation is typically one that has been previously encountered and modified by the interpreter as described in step 92 above. In some implementations, however, it is possible for the compiler to adaptively bind an operation and thereby eliminate the first look-up step 48 for an operation.

In a verification step 102, the interpreter will determine whether the previous binding is still appropriate by comparing the types of the arguments on the evaluation stack for the actual operation with the list 62 of types of formal arguments in the corresponding dictionary entry 52. If the types of formal arguments in the corresponding dictionary 52 are the same as the types of arguments in the operation, step 104 shows that the interpreter will execute the method referenced by the dictionary entry and then continue execution of the p-code program (step 106).

If the interpreter determines in verification step 102 that the types of arguments in the dictionary entry do not match the types of arguments in the operation, step 110 shows that the interpreter recovers the operation identifier 58 and the integer 60 representing the number of arguments from the dictionary entry 52. The interpreter then treats the operation as if were of the "unbound" type, that is, the process flows continues with step 48, which includes searching dictionary 50 for entries 52 matching the operation name and number of arguments and then comparing the types of arguments in the entry with the types of arguments in the actual operation. When a match is found, the method referenced by the dictionary entry is executed in step 88 by the interpreter, and the p-code is again modified in step 92 to include a reference to the matching dictionary entry.

In the event that no matching dictionary entry is found, step 112 indicates that an exception condition is reported and handled by appropriate exception routines that can include, for example, displaying an appropriate message to the users.

Skilled persons will recognize that the invention can be implemented in a variety of ways without departing from the inventive concept. For example, an additional binding code could be used to indicate to the interpreter that the p-code for an operation is not to be modified, so that the look-up by operation identifier and number of arguments will be performed each time the operation is executed. Still another binding code could be used to indicate that a particular operation is statically bound and that no dictionary look-up is required. These additional binding states would be set by the compiler, either automatically or in response to indicators inserted by a programmer into the source code. Because of the efficiency of adaptive binding, however, these additional binding codes are unnecessary in most applications.

Skilled persons will also recognize that there are many ways of implementing dictionary 50, which can be any structure that can contain the required data and that supports a look-up operation. In some computing environments, methods may be installed and removed while a program is being run. In such a case, the dictionary structure must be able to add entries as new methods are installed, and, to conserve memory, the dictionary should be able to delete entries for which no methods are installed and to which no operations are bound. In such a case, methods are registered, or added to the dictionary, when required. A separate binding table can be used to track which methods have an operation bound to them. The binding table can also be used in some implementations as an additional level of indirection into the dictionary, to accommodate additions, deletions, and rearrangements of the entries 52. If a bound operation refers to a dictionary entry that references a method that has unloaded, the interpreter treats the operation as an unbound operation and searches the dictionary for another match.

The references in the modified p-code to the dictionary entry can be in the form of keys, with each key unique to an entry in dictionary 50. Such keys are typically created by hashing techniques, and techniques for the use of such keys are known and relatively efficient. It is also possible to implement the invention by using an index into the dictionary instead of a key. It will be recognized that using an index will improve performance compared to using a key, because the index points directly to the dictionary entry and does not requiring searching entries for a key.

Use of an index, however, can be complicated if dictionary entries are changed or deleted, for example, when modules containing methods referenced by an entry are loaded or unloaded. Some of these complexities can be addressed by the use of an additional table, such as the binding table described above, to act as an additional level of indirection for dictionary look-ups. In such an implementation, references in the p-code would refer to entries in the binding table, which would then refer to the entries in the dictionary. The binding table could be updated as the dictionary is changed, so that methods bound to the p-code operations do not change when the dictionary changes.

A bound operation and an unbound operation are semantically identical in that they will both execute the same method. The bound operation will execute the method more efficiently than the unbound method, if the binding previously used passes the scoping and polymorphism rules, i.e., if the argument types of the present operation match those of the method and the method is still available. If the binding does not pass the polymorphism and scoping rules, the bound function executes slightly slower than the unbound function, because of the time required to test the binding.

In the preferred embodiment, an interpretter that performs adaptive binding is written in an object-oriented language, such as C++. Dictionary 50 is implemented as a container class that contains members of a method reference class. P-code items are also members of classes, and operations change class when they are bound.

It will be obvious that many changes may be made to the above-described details of the invention without departing from the underlying principles thereof. The scope of the present invention should, therefore, be determined only by the following claims.

I claim:

1. A computer-implemented method for dispatching a function call to an implementation during program execution, the function call occurring in a code segment and associated with a function identifier and actual function arguments describable by actual function argument information, the method comprising:

providing a dictionary including multiple dictionary entries, each dictionary entry including a function identifier, formal function argument information, and implementation reference information;

determining during a first execution of a code segment that an instruction in the code segment represents a function call, the function call including a function identifier and actual function arguments;

searching the dictionary to determine a first dictionary entry having a function identifier and formal function argument information corresponding to the function identifier and actual function argument information of the function call;

overwriting a portion of the instruction in the code segment that represents the function call with a dictionary entry reference to the first dictionary entry;

executing a function implementation indicated by the implementation reference information in the first dictionary entry;

determining during a subsequent execution of the code segment that the instruction in the code segment includes a dictionary entry reference to the first dictionary entry and actual function argument information associated with a second function call;

determining whether the actual argument information associated with the second function call corresponds to the formal function argument information in the dictionary entry referenced by the dictionary entry reference; and if the actual argument information associated with the second function call corresponds to the formal function argument information in the dictionary entry, executing the function implementation indicated by the implementation reference information in the first dictionary entry;

if the actual argument information associated with the instruction does not correspond to the formal function argument information in the dictionary entry, determining a function identifier from the dictionary entry referenced by the pointer; and searching the dictionary to determine a second dictionary entry having a function identifier and formal function argument information corresponding to the function identifier and actual function argument information of the function call.

2. The method of claim 1 further comprising overwriting the pointer in the code segment with a pointer to the second dictionary entry.

3. The method of claim 1 further comprising overwriting the pointer in the code segment with a key that corresponds to the second dictionary entry.

4. The method of claim 1 in which the formal function argument information includes the number and types of the function arguments.

5. The method of claim 1 in which the code segment comprises a segment of p-code.

6. The method of claim 5 in which the function identifier includes a compact operation reference.

7. The method of claim 5 in which the instruction includes a function identifier and a number of arguments and in which overwriting a portion of the instruction includes eliminating a compact operation reference and replacing the number of arguments with the dictionary entry reference.

8. A method of binding an entity to an identifier, the entity being selected in accordance with selection criteria from a dictionary including more than one entity, the selection criteria and the entity bound to the identifier capable of changing during program execution, the method comprising:

searching the dictionary for an entity meeting a selection criterion corresponding to a first occurrence of the identifier;

binding a first entity to the identifier for the first occurrence of the identifier;

determining during a second occurrence of the identifier whether the first entity meets a second selection criterion corresponding to the second occurrence;

if the first entity meets the second selection criterion, binding the first entity to the identifier for the second occurrence of the identifier; and if the first entity fails to meet the second selection criterion, searching the dictionary for a second entity meeting the second selection criterion, and binding the second entity to the identifier for the second occurrence of the identifier.

9. The method of claim 8 further comprising storing binding information associating the first occurrence of the identifier with the first entity.

10. The method of claim 9 in which the identifier is encountered in a code segment and in which the binding information is stored in the code segment.

11. The method of claim 10 in which a part of the identifier is replaced with the binding information.

12. The method of claim 10 in which the code segment comprises a p-code segment.

13. A computer-implemented method of binding a function call to an implementation in a p-code environment, the function call having associated therewith during each occurrence thereof function argument information including the number and types of arguments, the method comprising:

providing a dictionary including function argument information and references to implementations of the function, each implementation associated with particular argument information;

determining from the dictionary a first implementation associated with the function call during a first execution of the function call;

executing the first implementation;

storing information related to the association of the function call with the first implementation;

associating in accordance with the stored information the first implementation with the function call during a second execution of the function call, the second occurrence having associated second function argument information;

determining whether the second function argument information conforms to the first implementation;

if the second function argument information does not conform to the first implementation, determining a second implementation from the dictionary and associating the second implementation with the function call; and executing the associated implementation.

14. The method of claim 13 in which storing information related to the association includes modifying the function call in the p-code to indicate the association.

15. The method of claim 14 in which modifying the p-code includes modifying the p-code to directly access the function implementation.

16. The method of claim 14 in which modifying the p-code includes modifying the p-code to access the function implementation through the dictionary without a look-up operation.

* * * * *